United States Patent
Viswambaran

(10) Patent No.: US 11,447,268 B2
(45) Date of Patent: Sep. 20, 2022

(54) AIRFIELD TAXIWAY LIGHTS

(71) Applicant: HONEYWELL INTERNATIONAL INC., Charlotte, NC (US)

(72) Inventor: Vivek Viswambaran, Charlotte, NC (US)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 17/212,111

(22) Filed: Mar. 25, 2021

(65) Prior Publication Data

US 2021/0300592 A1  Sep. 30, 2021

(30) Foreign Application Priority Data

Mar. 25, 2020 (IN) .............................. 202011012971

(51) Int. Cl.
| | | |
|---|---|---|
| B64F 1/00 | (2006.01) | |
| B64F 1/20 | (2006.01) | |
| B64D 47/02 | (2006.01) | |
| F21V 14/06 | (2006.01) | |
| F21V 29/76 | (2015.01) | |

(Continued)

(52) U.S. Cl.
CPC ............... B64F 1/20 (2013.01); B64D 47/02 (2013.01); F21V 14/06 (2013.01); *B64D 2203/00* (2013.01); *F21V 29/76* (2015.01); *F21W 2111/06* (2013.01); *F21Y 2115/10* (2016.08)

(58) Field of Classification Search
CPC . B64D 47/02; F21V 14/06; B64F 1/20; B64F 1/205
See application file for complete search history.

(56) References Cited

U.S. PATENT DOCUMENTS

| | | | | |
|---|---|---|---|---|
| 3,586,851 A | * | 6/1971 | Rudolph | ................... F21V 9/12 |
| | | | | 362/293 |
| 4,860,182 A | * | 8/1989 | Vadseth | .................. F21S 8/022 |
| | | | | 362/364 |

(Continued)

FOREIGN PATENT DOCUMENTS

| | | |
|---|---|---|
| DE | 202009009583 | 9/2009 |
| EP | 0898680 | 11/2001 |

(Continued)

OTHER PUBLICATIONS https://www.luminitco.com/products/direction-turning-films (6 pgs) Date of Access: Jan. 16, 2020.

(Continued)

*Primary Examiner* — Gerald J Sufleta, II
(74) *Attorney, Agent, or Firm* — Brooks, Cameron & Huebsch, PLLC

(57) ABSTRACT

Airfield taxiway lights are described herein. One device includes a plurality of light sources, a plurality of prisms through which light emitted by the plurality of light sources is configured to pass, wherein the light emitted by each respective light source passes through a different one of the plurality of prisms, and a cover having a plurality of openings through which the light that passes through the plurality of prisms is configured to exit the airfield taxiway light, wherein each respective opening is positioned over a different one of the plurality of prisms.

17 Claims, 6 Drawing Sheets

(51) Int. Cl.
*F21Y 115/10* (2016.01)
*F21W 111/06* (2006.01)

(56) References Cited

U.S. PATENT DOCUMENTS

| | | | | |
|---|---|---|---|---|
| 4,914,544 | A * | 4/1990 | Dahlberg | B64F 1/20 362/153.1 |
| 5,335,151 | A * | 8/1994 | Dahlberg | B64F 1/20 362/153 |
| 5,556,189 | A * | 9/1996 | Wallis | B64F 1/205 362/153.1 |
| 5,669,691 | A * | 9/1997 | Barrow | F21V 21/04 362/153.1 |
| 6,168,294 | B1 * | 1/2001 | Emi | B64F 1/18 359/819 |
| 7,378,983 | B2 * | 5/2008 | Wang | H05B 45/22 340/815.45 |
| 9,696,020 | B2 * | 7/2017 | Salazar | F21V 21/04 |
| 10,247,370 | B2 * | 4/2019 | Schonert | F21V 31/005 |
| 2003/0048634 | A1 * | 3/2003 | You | F21V 5/02 362/153.1 |
| 2007/0047254 | A1 | 3/2007 | Schardt et al. | |
| 2009/0195395 | A1 * | 8/2009 | Cannistra | B64F 1/205 340/600 |
| 2013/0170205 | A1 * | 7/2013 | Abel | F21V 29/507 362/235 |
| 2013/0265756 | A1 * | 10/2013 | Christoffersen | F21V 9/40 362/235 |
| 2013/0286653 | A1 * | 10/2013 | Holman | F21K 9/61 362/293 |
| 2013/0335979 | A1 * | 12/2013 | Lauret | F21V 5/045 362/311.02 |
| 2014/0268647 | A1 * | 9/2014 | Blondin | F21V 29/90 362/92 |
| 2014/0376220 | A1 * | 12/2014 | Shen | G02B 5/0231 362/235 |
| 2019/0241279 | A1 * | 8/2019 | Millet | B64D 47/02 |
| 2019/0382132 | A1 * | 12/2019 | Jha | B64D 47/04 |

FOREIGN PATENT DOCUMENTS

| | | | | |
|---|---|---|---|---|
| JP | | 2002008414 | 1/2002 | |
| JP | | 5304904 | 10/2013 | |
| WO | WO-0053494 | A1 * | 9/2000 | F21V 5/02 |

OTHER PUBLICATIONS

European Extended Search Report for related EP Application No. 21165072.6, dated Aug. 23, 2021 (9 ogs).

* cited by examiner

AIRFIELD TAXIWAY LIGHTS

CROSS-REFERENCE TO RELATED APPLICATIONS

This application claims priority pursuant to 35 U.S.C. 119(a) of India Patent Application No. 202011012971, filed Mar. 25, 2020, which application is incorporated herein by reference in its entirety.

TECHNICAL FIELD

The present disclosure relates generally to airfield taxiway light devices, methods, and systems.

BACKGROUND

Airfield infrastructure can include terminals, hangars, maintenance facilities, etc. Airfields can further include runways, approach ways, taxiways, and/or intersections therebetween to direct aircraft traffic and/or other vehicles in and/or around the airfield.

Airfields can include lighting systems to provide visual cues and/or signals for an airfield. For example, airfield lighting systems can include airfield taxiway lights, such as taxiway centerline lights, to direct aircraft and/or other vehicles in and/or around the taxiways and/or intersections therebetween. The taxiway lights may, in some instances, have requirements mandated by regulatory bodies such as the International Civil Aviation Organization (ICAO) and/or Federal Aviation Administration (FAA), among others.

Taxiway lights (e.g., taxiway centerline lights) can provide a safe and efficient way to regulate airfield traffic. For example, taxiway centerline lights may assist aircraft pilots in taxiing their aircraft between the runway and apron stands of the airfield. Taxiway centerline lights may be particularly useful at night, at a visual range of 350 meters or greater, and/or on complex taxiway intersections and exit taxiways.

As an example, taxiway centerline toed (e.g., toe-in) lights and/or wide (e.g., ultra-wide) lights may be used on the centerline of curved portions of the taxiway along the designated taxiing paths of the taxiway. The beam nature of such lights allows the pilot to see the light from an offset angle, such as when maneuvering a curve of the taxiway. For instance, a wide light may be used in portions of the taxiway where the aircraft may be negotiating gradual curves, such as where the aircraft may take after a rapid exit from the runway. For portions of the taxiway where the aircraft may be taking sharper curves, a toed light may be used.

DETAILED DESCRIPTION

Figure 1:
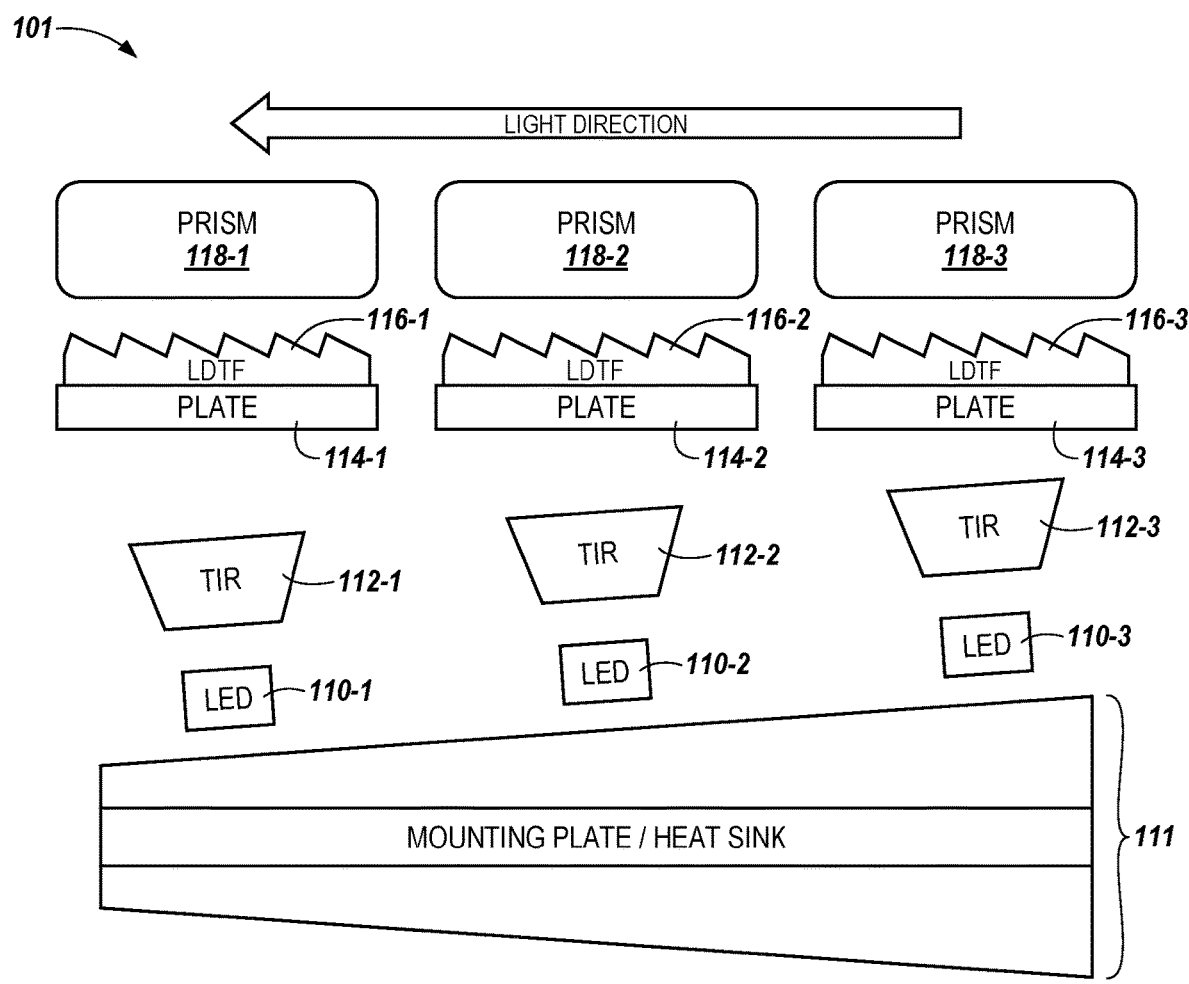
FIG. 1 illustrates a block diagram of an example airfield taxiway light in accordance with an embodiment of the present disclosure.

Airfield taxiway lights are described herein. For example, an embodiment includes a plurality of light sources, a plurality of prisms through which light emitted by the plurality of light sources is configured to pass, wherein the light emitted by each respective light source passes through a different one of the plurality of prisms, and a cover having a plurality of openings through which the light that passes through the plurality of prisms is configured to exit the airfield taxiway light, wherein each respective opening is positioned over a different one of the plurality of prisms.

Airfield taxiway lights (e.g., taxiway centerline lights) need to be able to withstand the weight loads of the aircraft using the taxiway. However, as the weight loads of aircraft continue to increase, previous taxiway centerline lights (e.g., conventional centerline toed and wide lights) may not be able to withstand these increased weight loads. For instance, the cover (e.g., top cover) of previous taxiway centerline lights may not be strong enough to withstand these increased weight loads.

Further, previous taxiway centerline lights may have bulky, expensive optics, which can increase the cost of the light (e.g., both the cost of the optical elements of the light and the cost of manufacturing the light), and increase the vulnerability of the light to various operating conditions of the taxiway. For example, previous taxiway centerline lights may have a Fresnel lens made of glass (or equivalent material), which may require a large prism. This may cause the light to protrude more above ground level, which may cause the light to be more affected by the movement of the aircraft along the taxiway. Further, previous taxiway centerline lights may have a long exit prism window, which can make the prism vulnerable to static loads and the scraping of snowplow blades on the taxiway.

In contrast, airfield taxiway lights (e.g., taxiway centerline lights) in accordance with the present disclosure can withstand the increased weight loads of aircraft using the taxiway. For instance, taxiway centerline lights in accordance with the present disclosure may have a cover (e.g., a top cover) design that is capable of withstanding these increased weight loads.

Further, taxiway centerline lights in accordance with the present disclosure may have smaller (e.g., micro), cheaper optics than previous taxiway centerline lights, which can decrease the cost of the light (e.g., both the cost of the optical elements of the light and the cost of manufacturing the light), and decrease the vulnerability of the light to the operating conditions of the taxiway, as compared to previous taxiway centerline lights. For example, taxiway centerline lights in accordance with the present disclosure may not use bulky, thick optical elements such as Fresnel lenses, which can reduce the cost of the light as compared with previous taxiway centerline lights, and reduce optical losses that may be caused by such optical elements. Further, taxiway centerline lights in accordance with the present disclosure may use smaller prisms than previous taxiway centerline lights, which can increase the strength and longevity of the light. Further, taxiway centerline lights in accordance with the present disclosure may have a smaller exit prism window than previous taxiway centerline lights, which can make the prism of the light stronger and able to withstand static loads and the scraping of snowplow blades on the taxiway.

Further, taxiway centerline lights in accordance with the present disclosure can comply with requirements mandated by regulatory bodies such as the International Civil Aviation Organization (ICAO) and/or Federal Aviation Administration (FAA), among others. For example, the light beams (e.g., the properties of the light beams, such as the beam intensity, angle, full width at half maximum, and/or color) emitted by taxiway centerline lights in accordance with the present disclosure can comply with the requirements mandated by such regulatory bodies.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 330 may reference element "30" in FIG. 3, and a similar element may be referenced as 530 in FIG. 5.

As used herein, "a", "an", or "a number of" something can refer to one or more such things, while "a plurality of" something can refer to more than one such things. For example, "a number of prisms" can refer to one or more prisms, while "a plurality of prisms" can refer to more than one prism.

FIG. 1 illustrates a block diagram of an example airfield taxiway light 101 in accordance with an embodiment of the present disclosure. Airfield taxiway light 101 can be, for instance, a taxiway centerline toed (e.g., toe left) light.

As shown in FIG. 1, airfield taxiway light 101 can include a mounting plate 111 that comprises a heat sink. Mounting plate 111 (e.g., the heat sink) can be horizontally angled from left to right, as illustrated in FIG. 1. For instance, the heat sink can have an angle of 4 degrees relative to horizontal.

As shown in FIG. 1, airfield taxiway light 101 can include a plurality of light sources 110-1, 110-2, 110-3, which may be collectively referred to herein as light sources 110. For instance, in the embodiment illustrated in FIG. 1, light 101 includes three light sources 110. However, embodiments of the present are not so limited. For instance, some embodiments may include six light sources, as will be further described herein.

As shown in FIG. 1, light sources 110 can be arranged in a row. For instance, light sources 110-1 and 110-3 can be positioned at each side of the row, and light source 110-2 can be positioned between (e.g., in the middle of) light sources 110-1 and 110-3 in the row, as illustrated in FIG. 1. In the example illustrated in FIG. 1, light sources 110 are light emitting diodes (LEDs). Further, light sources 110 can be arranged at the same angle as (e.g., horizontally angled with) mounting plate 111, as illustrated in FIG. 1. For instance, although not illustrated in FIG. 1, light sources 110 can be coupled to the heat sink of mounting plate 111.

As shown in FIG. 1, airfield taxiway light 101 can include a plurality of plates (e.g., prism support plates) 114-1, 114-2, 114-3, which may be collectively referred to herein as plates 114. The number of plates 114 (e.g., three) included in light 101 can be the same as the number of light sources 110 included in light 101 (e.g., three), as illustrated in FIG. 1. Plates 114 can be arranged in a row, as illustrated in FIG. 1. For instance, plates 114-1 and 114-3 can be positioned at each side of the row, and plate 114-2 can be positioned between (e.g., in the middle of) plates 114-1 and 114-3 in the row, as illustrated in FIG. 1.

As shown in FIG. 1, a light direction turning film (LDTF), collectively referred to herein as LDTF 116, can be coupled (e.g., attached) to plates 114 (e.g., to each respective plate 114-1, 114-2, 114-3). For instance, LDTF 116-1 can be coupled to plate 114-1, LDTF 116-2 can be coupled to plate 114-2, and LDTF 116-3 can be coupled to plate 114-3, as illustrated in FIG. 1. LDTF 116 can be coupled to the sides of plates 114 that are opposite the sides of plates 114 that face light sources 110, as illustrated in FIG. 1.

LDTF 116 can have a micro-prismatic structure, as illustrated in FIG. 1. The micro-prismatic structure of LDTF 116 can change the direction of light emitted by a light source (e.g., light sources 110), as will be further described herein. The direction in which the beam is turned depends on the orientation of the LDTF. The thickness of LDTF 116 can be, for instance, 0.01 inch.

As shown in FIG. 1, airfield taxiway light 101 can include a plurality of prisms 118-1, 118-2, 118-3, which may be collectively referred to herein as prisms 118. The number of prisms 118 (e.g., three) included in light 101 can be the same as the number of light sources 110 included in light 101 (e.g., three), as illustrated in FIG. 1.

Prisms 118 can be arranged in a row, as illustrated in FIG. 1. For instance, prisms 118-1 and 118-3 can be positioned at each side of the row, and prism 118-2 can be positioned between (e.g., in the middle of) light prisms 118-1 and 118-3 in the row, as illustrated in FIG. 1. Further, each respective prism 118 can be supported by a different one of plates 114, such that LDTF 116 is located between each respective light source 110 and a different one of prisms 118. For instance, plate 114-1 can support prism 118-1 such that LDTF 116-1 is between light source 110-1 and prism 118-1, plate 114-2 can support prism 118-2 such that LDTF 116-2 is between light source 110-2 and prism 118-2, and plate 114-3 can support prism 118-3 such that LDTF 116-3 is between light source 110-3 and prism 118-3, as illustrated in FIG. 1. However, embodiments are not limited to separate plates 114. For instance, in some embodiments, prisms 118 can each be supported by a common plate. Further, in some embodiments, plates 114 can be coupled (e.g., linked) together.

Light sources 110 (e.g., each respective light source 110-1, 110-2, 110-3) can emit light. The light emitted by light sources 110 can undergo, and be controlled by, total internal reflection (TIR) within airfield taxiway light 101. For instance, the light emitted by light source 110-1 can undergo narrow beam at TIR element 112-1, the light emitted by light source 110-2 can undergo wide beam at TIR element 112-2, and the light emitted by light source 110-3 can undergo wide beam at TIR element 112-3, as illustrated in FIG. 1.

The light emitted by light sources 110 can pass through LDTF 116. For example, the light emitted by each respective light source 110-1, 110-2, 110-3 can pass through the LDTF 116-1, 116-2, 116-3 that is between that light source and the prism supported by the plate to which that LDTF is coupled. For instance, in the example illustrated in FIG. 1, the light emitted by light source 110-1 can pass through LDTF 116-1, the light emitted by light source 110-2 can pass through LDTF 116-2, and the light emitted by light source 110-3 can pass through LDTF 116-3.

As the light emitted by light sources 110 passes through LDTF 116, LDTF 116 (e.g., the micro-prismatic structure of LDTF 116) can change the direction of (e.g., turn) the light. For instance, LDTF 116-1 can change the direction of the light emitted by light source 110-1, LDTF 116-2 can change the direction of the light emitted by light source 110-2, and LDTF 116-3 can change the direction of the light emitted by light source 110-3.

LDTF 116 (e.g., each respective LDTF 116-1, 116-2, 116-3) can be oriented to change the direction of the light emitted by each respective light source 110-1, 110-2, 110-3 in the same direction (e.g., the orientation of each respective LDTF 116-1, 116-2, 116-3 can be the same, as illustrated in FIG. 1). For instance, in the example illustrated in FIG. 1, each respective LDTF 116-1, 116-2, 116-3 is oriented to turn (e.g., toe) the light emitted by each respective light source 110-1, 110-2, 110-3 to the left.

After the light emitted by light sources 110 passes through (e.g., is turned by) LDTF 116, the light can pass through prisms 118. For example, the light emitted by each respective light source 110-1, 110-2, 110-3 can pass through a different one of prisms 118-1, 118-2, 118-3 (e.g., through the prism that is supported by the plate to which the LDTF through which that light passes is coupled). For instance, in the example illustrated in FIG. 1, the light emitted by light source 110-1 can pass through prism 118-1, the light emitted by light source 110-2 can pass through prism 118-2, and the light emitted by light source 110-3 can pass through prism 118-3.

After the light emitted by light sources 110 passes through prisms 118, the light can exit airfield taxiway light 101. For example, the light can exit airfield taxiway light 101 through openings in the cover (e.g., top cover) of airfield taxiway light 101, as will be further described herein (e.g., in connection with FIGS. 4-6).

Figure 2:
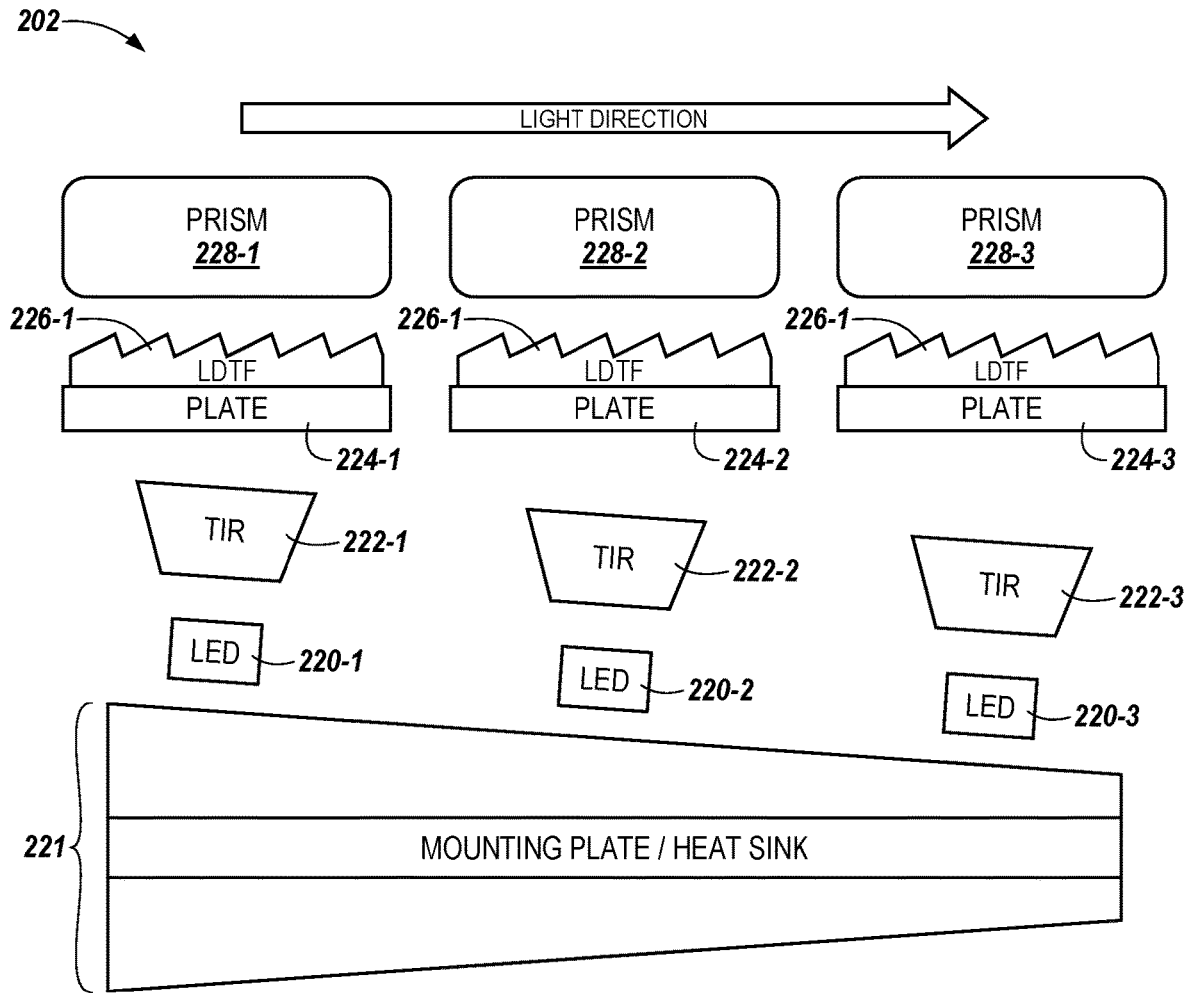
FIG. 2 illustrates a block diagram of an example airfield taxiway light in accordance with an embodiment of the present disclosure.

FIG. 2 illustrates a block diagram of an example airfield taxiway light 202 in accordance with an embodiment of the present disclosure. Airfield taxiway light 202 can be, for instance, a taxiway centerline toed (e.g., toe right) light.

As shown in FIG. 2, airfield taxiway light 202 can include a mounting plate 221 that comprises a heat sink. Mounting plate 221 (e.g., the heat sink) can be horizontally angled from right to left, as illustrated in FIG. 2. For instance, the heat sink can have an angle of 4 degrees relative to horizontal.

As shown in FIG. 2, airfield taxiway light 202 can include a plurality of light sources 220-1, 220-2, 220-3, which may be collectively referred to herein as light sources 220. For instance, in the embodiment illustrated in FIG. 2, light 202 includes three light sources 220. However, embodiments of the present are not so limited. For instance, some embodiments may include six light sources, as will be further described herein.

As shown in FIG. 2, light sources 220 can be arranged in a row. For instance, light sources 220-1 and 220-3 can be positioned at each side of the row, and light source 220-2 can be positioned between (e.g., in the middle of) light sources 220-1 and 220-3 in the row, as illustrated in FIG. 2. In the example illustrated in FIG. 2, light sources 220 are LEDs.

Further, light sources 220 can be arranged at the same angle as (e.g., horizontally angled with) mounting plate 221, as illustrated in FIG. 2. For instance, although not illustrated in FIG. 2, light sources 220 can be coupled to the heat sink of mounting plate 221.

As shown in FIG. 2, airfield taxiway light 202 can include a plurality of plates (e.g., prism support plates) 224-1, 224-2, 224-3, which may be collectively referred to herein as plates 224. The number of plates 224 (e.g., three) included in light 202 can be the same as the number of light sources 220 included in light 202 (e.g., three), as illustrated in FIG. 2. Plates 224 can be arranged in a row, as illustrated in FIG. 2. For instance, plates 224-1 and 224-3 can be positioned at each side of the row, and plate 224-2 can be positioned between (e.g., in the middle of) plates 224-1 and 224-3 in the row, as illustrated in FIG. 1.

As shown in FIG. 2, a light direction turning film (LDTF), collectively referred to herein as LDTF 226, can be coupled (e.g., attached) to plates 224 (e.g., to each respective plate 224-1, 224-2, 224-3). For instance, LDTF 226-1 can be coupled to plate 224-1, LDTF 226-2 can be coupled to plate 224-2, and LDTF 226-3 can be coupled to plate 224-3, as illustrated in FIG. 2. LDTF 226 can be coupled to the sides of plates 224 that are opposite the sides of plates 224 that face light sources 220, as illustrated in FIG. 2.

LDTF 226 can have a micro-prismatic structure, as illustrated in FIG. 2. The micro-prismatic structure of LDTF 226 can change the direction of light emitted by a light source (e.g., light sources 220), as will be further described herein. The direction in which the beam is turned depends on the orientation of the LDTF. The thickness of LDTF 226 can be, for instance, 0.01 inch.

As shown in FIG. 2, airfield taxiway light 202 can include a plurality of prisms 228-1, 228-2, 228-3, which may be collectively referred to herein as prisms 228. The number of prisms 228 (e.g., three) included in light 202 can be the same as the number of light sources 220 included in light 202 (e.g., three), as illustrated in FIG. 2.

Prisms 228 can be arranged in a row, as illustrated in FIG. 2. For instance, prisms 228-1 and 228-3 can be positioned at each side of the row, and prism 228-2 can be positioned between (e.g., in the middle of) prisms 228-1 and 228-3 in the row, as illustrated in FIG. 2. Further, each respective prism 228 can be supported by a different one of plates 224, such that LDTF 226 is located between each respective light source 220 and a different one of prisms 228. For instance, plate 224-1 can support prism 228-1 such that LDTF 226-1 is between light source 220-1 and prism 228-1, plate 224-2 can support prism 228-2 such that LDTF 226-2 is between light source 220-2 and prism 228-2, and plate 224-3 can support prism 228-3 such that LDTF 226-3 is between light source 220-3 and prism 228-3, as illustrated in FIG. 2.

Light sources 220 (e.g., each respective light source 220-1, 220-2, 220-3) can emit light. The light emitted by light sources 220 can undergo, and be controlled by, total internal reflection (TIR) within airfield taxiway light 202. For instance, the light emitted by light source 220-1 can undergo wide beam at TIR element 222-1, the light emitted by light source 220-2 can undergo wide beam at TIR element 222-2, and the light emitted by light source 220-3 can undergo narrow beam at TIR element 222-3, as illustrated in FIG. 2.

The light emitted by light sources 220 can pass through LDTF 226. For example, the light emitted by each respective light source 220-1, 220-2, 220-3 can pass through the LDTF 226-1, 226-2, 226-3 that is between that light source and the prism supported by the plate to which that LDTF is coupled. For instance, in the example illustrated in FIG. 2, the light emitted by light source 220-1 can pass through LDTF 226-1, the light emitted by light source 220-2 can pass through LDTF 226-2, and the light emitted by light source 220-3 can pass through LDTF 226-3.

As the light emitted by light sources 220 passes through LDTF 226, LDTF 226 (e.g., the micro-prismatic structure of LDTF 226) can change the direction of (e.g., turn) the light. For instance, LDTF 226-1 can change the direction of the light emitted by light source 220-1, LDTF 226-2 can change the direction of the light emitted by light source 220-2, and LDTF 226-3 can change the direction of the light emitted by light source 220-3.

LDTF 226 (e.g., each respective LDTF 226-1, 226-2, 226-3) can be oriented to change the direction of the light emitted by each respective light source 220-1, 220-2, 220-3 in the same direction (e.g., the orientation of each respective LDTF 226-1, 226-2, 226-3 can be the same, as illustrated in FIG. 2). For instance, in the example illustrated in FIG. 2, each respective LDTF 226-1, 226-2, 226-3 is oriented to turn (e.g., toe) the light emitted by each respective light source 220-1, 220-2, 220-3 to the right. That is, LDTF 226 can be orientated in the opposite direction from LDTF 116 described and illustrated in connection with FIG. 1.

After the light emitted by light sources 220 passes through (e.g., is turned by) LDTF 226, the light can pass through prisms 228. For example, the light emitted by each respective light source 220-1, 220-2, 220-3 can pass through a different one of prisms 228-1, 228-2, 228-3 (e.g., through the prism that is supported by the plate to which the LDTF through which that light passes is coupled). For instance, in the example illustrated in FIG. 2, the light emitted by light source 220-1 can pass through prism 228-1, the light emitted by light source 220-2 can pass through prism 228-2, and the light emitted by light source 220-3 can pass through prism 228-3.

After the light emitted by light sources 220 passes through prisms 228, the light can exit airfield taxiway light 202. For example, the light can exit airfield taxiway light 202 through openings in the cover (e.g., top cover) of airfield taxiway light 202, as will be further described herein (e.g., in connection with FIGS. 4-6).

Figure 3:
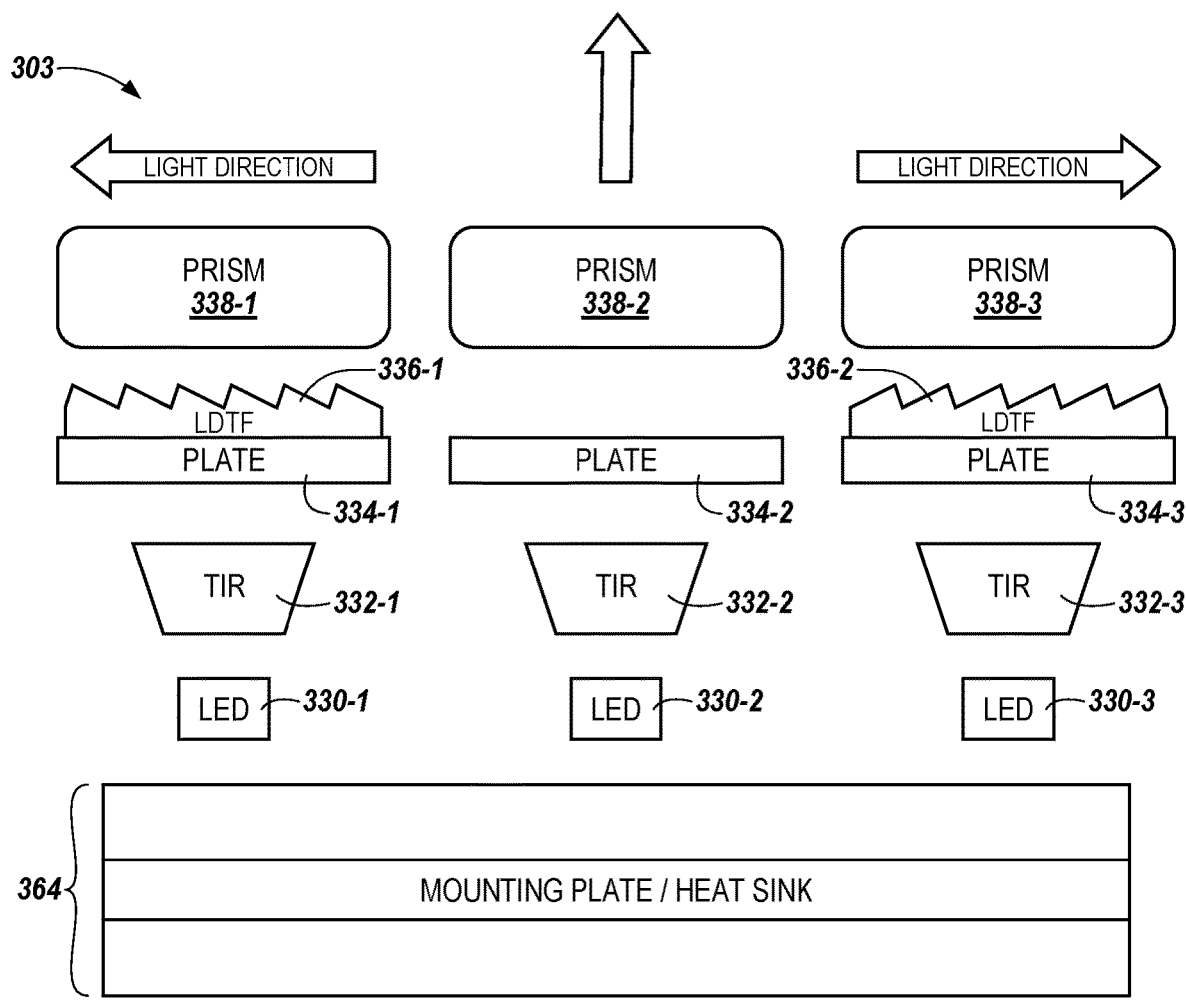
FIG. 3 illustrates a block diagram of an example airfield taxiway light in accordance with an embodiment of the present disclosure.

FIG. 3 illustrates a block diagram of an example airfield taxiway light 303 in accordance with an embodiment of the present disclosure. Airfield taxiway light 303 can be, for instance, a taxiway centerline wide (e.g., ultra-wide) light.

As shown in FIG. 3, airfield taxiway light 303 can include a mounting plate 364 that comprises a heat sink. Mounting plate 364 (e.g., the heat sink) may not be horizontally angled (e.g., may be angled flat relative to horizontal) as illustrated in FIG. 3.

As shown in FIG. 3, airfield taxiway light 303 can include a plurality of light sources 330-1, 330-2, 330-3, which may be collectively referred to herein as light sources 330. For instance, in the embodiment illustrated in FIG. 3, light 303 includes three light sources 330. However, embodiments of the present are not so limited. For instance, some embodiments may include six light sources, as will be further described herein.

As shown in FIG. 3, light sources 330 can be arranged in a row. For instance, light sources 330-1 and 330-3 can be positioned at each side of the row, and light source 330-2 can be positioned between (e.g., in the middle of) light sources 330-1 and 330-3 in the row, as illustrated in FIG. 1. In the example illustrated in FIG. 3, light sources 330 are LEDs. Further, although not illustrated in FIG. 3, light sources 330 can be coupled to the heat sink of mounting plate 364.

As shown in FIG. 3, airfield taxiway light 303 can include a plurality of plates (e.g., prism support plates) 334-1, 334-2, 334-3, which may be collectively referred to herein as plates 334. The number of plates 334 (e.g., three) included in light 303 can be the same as the number of light sources 330 included in light 332 (e.g., three), as illustrated in FIG. 3. Plates 334 can be arranged in a row, as illustrated in FIG. 3. For instance, plates 334-1 and 334-3 can be positioned at each side of the row, and plate 334-2 can be positioned between (e.g., in the middle of) plates 334-1 and 334-3 in the row, as illustrated in FIG. 3.

As shown in FIG. 3, a light direction turning film (LDTF), collectively referred to herein as LDTF 336, can be coupled (e.g., attached) to two of the plates 324. For example, LDTF 336 can be coupled to the plates positioned at each side (e.g., the outer plates) of the row. For instance, LDTF 336-1 can be coupled to plate 334-1, and LDTF 336-2 can be coupled to plate 334-3, as illustrated in FIG. 3. LDTF 336-1 and 336-2 can be coupled to the sides of plates 334-1 and 334-3, respectively, that are opposite the sides of plates 334-1 and 334-3 that face light sources 330-1 and 330-3, respectively, as illustrated in FIG. 3.

As shown in FIG. 3, no LDTF is coupled to the third of the plates 324. For example, no LDTF is coupled to the plate positioned in the middle (e.g., the middle plate) of the row. For instance, no LDTF is coupled to plate 334-2, as illustrated in FIG. 3.

LDTF 336 can have a micro-prismatic structure, as illustrated in FIG. 3. The micro-prismatic structure of LDTF 336 can change the direction of light emitted by a light source (e.g., light sources 330-1 and 330-3), as will be further described herein. The direction in which the beam is turned depends on the orientation of the LDTF. The thickness of LDTF 336 can be, for instance, 0.01 inch.

As shown in FIG. 3, airfield taxiway light 303 can include a plurality of prisms 338-1, 338-2, 338-3, which may be collectively referred to herein as prisms 338. The number of prisms 338 (e.g., three) included in light 303 can be the same as the number of light sources 330 included in light 303 (e.g., three), as illustrated in FIG. 3.

Prisms 338 can be arranged in a row, as illustrated in FIG. 3. For instance, prisms 338-1 and 338-3 can be positioned at each side of the row, and prism 338-2 can be positioned between (e.g., in the middle of) prisms 338-1 and 338-3 in the row, as illustrated in FIG. 2. Further, each respective prism 338 can be supported by a different one of plates 334. For instance, plate 334-1 can support prism 338-1 such that LDTF 336-1 is between light source 330-1 and prism 338-1, plate 334-2 can support prism 338-2 such that no LDTF is between light source 330-2 and prism 338-2, and plate 334-3 can support prism 338-3 such that LDTF 336-2 is between light source 330-3 and prism 338-3, as illustrated in FIG. 3.

Light sources 330 (e.g., each respective light source 330-1, 330-2, 330-3) can emit light. The light emitted by light sources 330 can undergo, and be controlled by, total internal reflection (TIR) within airfield taxiway light 303. For instance, the light emitted by light source 330-1 can undergo narrow beam at TIR element 332-1, the light emitted by light source 330-2 can undergo wide beam at TIR element 332-2, and the light emitted by light source 330-3 can undergo narrow beam at TIR element 332-3, as illustrated in FIG. 3.

The light emitted by light sources 330-1 and 330-3 can pass through the LDTF 336 that is between that light source and the prism supported by the plate to which that LDTF is coupled. For instance, in the example illustrated in FIG. 3, the light emitted by light source 330-1 can pass through LDTF 336-1, and the light emitted by light source 330-3 can pass through LDTF 336-2. However, the light emitted by light source 330-2 may not pass through a LDTF.

As the light emitted by light sources 330-1 and 330-3 passes through LDTF 336-1 and 336-3, respectively, the LDTFs (e.g., the micro-prismatic structure of the LDTFs) can change the direction of (e.g., turn) the light. For instance, LDTF 336-1 can change the direction of the light emitted by light source 330-1, and LDTF 336-3 can change the direction of the light emitted by light source 330-3. However, because the light emitted by light source 330-2 does not pass through a LDTF, its direction does not change (e.g., its direction is not turned).

LDTF 326-1 can be oriented to change the direction of the light emitted by light source 320-1 in a first direction, and LDTF 326-2 can be oriented to change the direction of the light emitted by light source 320-3 in a second direction that is opposite the first direction (e.g., the orientation of LDTF 326-1 can be opposite the orientation of LDTF 326-2, as illustrated in FIG. 3). For instance, in the example illustrated in FIG. 3, LDTF 336-1 is oriented to turn the light emitted by light source 320-1 to the left, and LDTF 336-2 is oriented to turn the light emitted by light source 320-3 to the right.

After the light emitted by light sources 330-1 and 330-3 passes through (e.g., is turned by) LDTFs 336-1 and 336-2, respectively, the light can pass through prisms 338-1 and 338-3, respectively. Further, the light emitted by light source 330-2 can pass through prism 338-2 without first passing through a LDTF. As such, in the example illustrated in FIG. 3, the light emitted by light source 330-1 can pass through prism 338-1 after being turned to the left, the light emitted by light source 330-2 can pass through prism 338-2 without being turned, and the light emitted by light source 330-3 can pass through prism 338-3 after being turned to the right.

After the light emitted by light sources 330 passes through prisms 338, the light can exit airfield taxiway light 303. For example, the light can exit airfield taxiway light 303 through openings in the cover (e.g., top cover) of airfield taxiway light 303, as will be further described herein (e.g., in connection with FIGS. 4-6).

Figure 4:
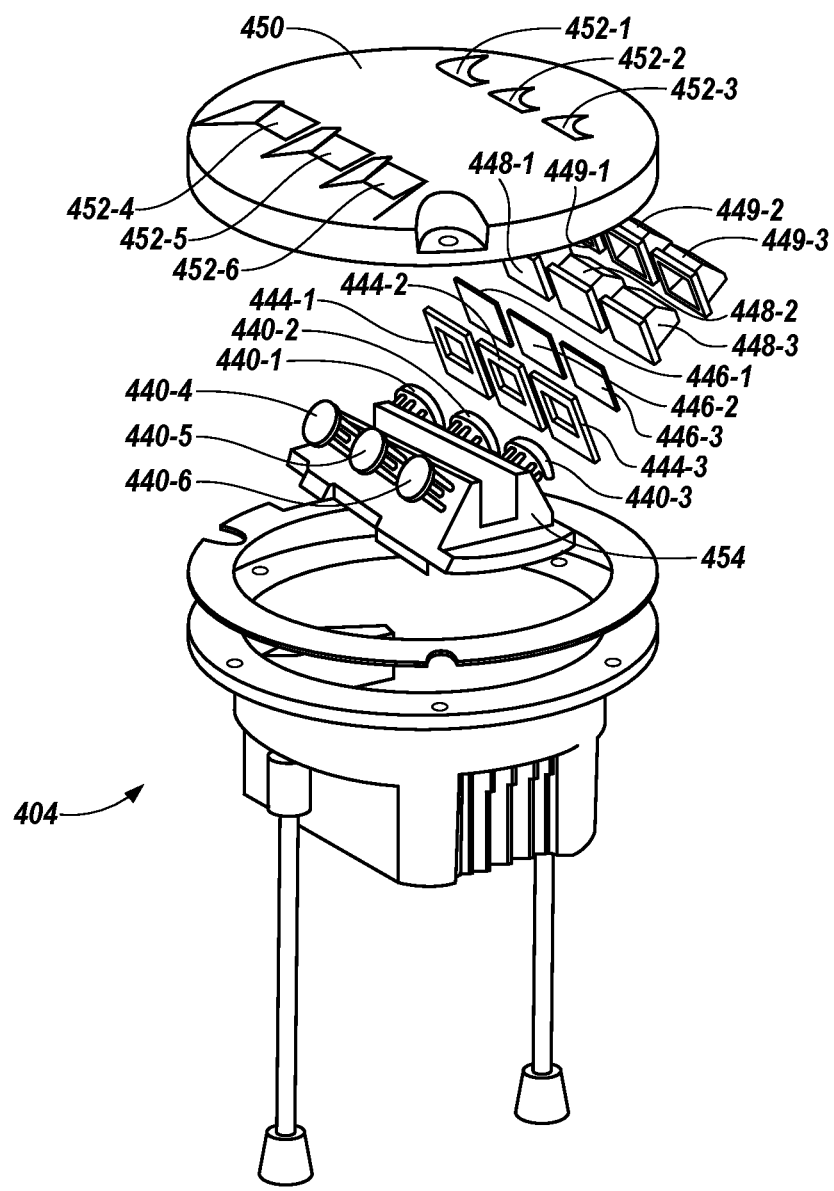
FIG. 4 illustrates an exploded perspective view of an example airfield taxiway light in accordance with an embodiment of the present disclosure.

FIG. 4 illustrates an exploded perspective view of an example airfield taxiway light 404 in accordance with an embodiment of the present disclosure. Airfield taxiway light 404 can be, for instance, a taxiway centerline toed (e.g., toe right or toe left) light. For instance, airfield taxiway light 404 can be airfield taxiway light 101 previously described in connection with FIG. 1 or airfield taxiway light 202 previously described in connection with FIG. 2.

As shown in FIG. 4, airfield taxiway light 404 can include a mounting plate 454 that comprises a heat sink, and a plurality of light sources 440-1, 440-2, 440-3, 440-4, 440-5, 440-6, which may be collectively referred to herein as light sources 440. Light sources 440 can be coupled to mounting plate 454 (e.g., to the heat sink), as illustrated in FIG. 4.

In the embodiment illustrated in FIG. 4, airfield taxiway light 404 includes six light sources 440, which can be arranged in two different rows. For instance, light sources 440-1, 440-2, and 440-3 can be a first row of light sources that face a first direction and are analogous to light sources 110-1, 110-2, 110-3 previously described in connection with FIG. 1 or light sources 220-1, 220-2, 220-3 previously described in connection with FIG. 2, and light sources 440-4, 440-5, and 440-6 can be a second row of light sources that face a second direction and are also analogous to light sources 110-1, 110-2, 110-3 or light sources 220-1, 220-2, 220-3. For instance, light sources 440 can emit light in a manner analogous to light sources 110 or 220.

As shown in FIG. 4, airfield taxiway light 404 can include plates (e.g., prism support plates) 444-1, 444-2, 444-3, which may be collectively referred to herein as plates 444. Plates 444-1, 444-2, and 444-3 can be a first row of plates that are analogous to plates 114-1, 114-2, 114-3 previously described in connection with FIG. 1 or plates 224-1, 224-2, 224-3 previously described in connection with FIG. 2. Further, although not shown in FIG. 4 for clarity and so as not to obscure embodiments of the present disclosure, airfield taxiway light 404 can also include a second row of three plates that are also analogous to plates 114-1, 114-2, 114-3 or plates 224-1, 224-2, 224-3.

As shown in FIG. 4, airfield taxiway light 404 can include LDTFs 446-1, 446-2, 446-3, which may be collectively referred to as LDTF 446. LDTF 446 can be analogous to LDTF 116 previously described in connection with FIG. 1 or LDTF 226 previously described in connection with FIG. 2. For example, LDTFs 446-1, 446-2, and 446-3 can be coupled to plates 444-1, 444-2, and 444-3, respectively, in a manner analogous to that previously described in connection with FIG. 1 or FIG. 2. Further, although not shown in FIG. 4 for clarity and so as not to obscure embodiments of the present disclosure, airfield taxiway light 404 can also include an analogous LDTF that can be coupled to the three plates of the second row of plates in an analogous manner.

The light emitted by light sources 440 can pass through LDTF 446 and the LDTF coupled to the three plates of the second row of plates in a manner analogous to that previously described in connection with FIG. 1 or FIG. 2. As the light emitted by light sources 440 passes through the LDTFs, the LDTFs (e.g., the micro-prismatic structure of the LDTFs) can change the direction of (e.g., turn) the light, in a manner analogous to that previously described in connection with FIG. 1 or FIG. 2. For instance, if the LDTFs are analogous to LDTF 116 previously described in connection with FIG. 1, the light emitted by light sources 440 may be turned to the left, and if the LDTFs are analogous to LDTF 226 previously described in connection with FIG. 2, the light emitted by light sources 440 may be turned to the right.

As shown in FIG. 4, airfield taxiway light 404 can include prisms 448-1, 448-2, 448-3, which may be collectively referred to herein as prisms 448. Prisms 448-1, 448-2, and 448-3 can be a first row of prisms that are analogous to prisms 118-1, 118-2, 118-3 previously described in connection with FIG. 1 or prisms 228-1, 228-2, 228-3 previously described in connection with FIG. 2. For instance, prisms 448-1, 448-2, 448-3 can be supported by plates 444-1, 444-2, 444-3, respectively, such that LDTF 446 is between each respective light source 440 and prisms 444, in a manner analogous to that previously described in connection with FIG. 1 or FIG. 2. Further, after the light emitted by light sources 440 passes through (e.g., is turned by) LDTF 446, the light can pass through prisms 448, in a manner analogous to that previously described in connection with FIG. 1 or FIG. 2. Further, although not shown in FIG. 4 for clarity and so as not to obscure embodiments of the present disclosure, airfield taxiway light 404 can also include a second row of three prisms that are also analogous to prisms 118-1, 118-2, 118-3 or prisms 228-1, 228-2, 228-3.

As shown in FIG. 4, airfield taxiway light 404 can include prism covers 449-1, 449-2, 449-3, which may be collectively referred to as prism covers 449. Each respective prism 448 can be covered by a different one of prism covers 449 to provide protection for prisms 448. For instance, prism 448-1 can be covered (e.g., protected) by cover 449-1, prism 448-2 can be covered by cover 449-2, and prism 448-3 can be covered by cover 449-3, as illustrated in FIG. 4. Further, although not shown in FIG. 4 for clarity and so as not to obscure embodiments of the present disclosure, airfield taxiway light 404 can also include three additional prism covers analogous to prism covers 449 to cover the three respective prisms of second row of prisms.

As shown in FIG. 4, airfield taxiway light 404 can include a cover (e.g., top cover) 450. Cover 450 can include a plurality of openings (e.g., windows) 452-1, 452-2, 452-3, 452-4, 452-5, 452-6, which may be collectively referred to herein as openings 452, as illustrated in FIG. 4. The number of openings 452 (e.g., six) included in cover 450 can be the same as the number of light sources 440 included in airfield taxiway light 404 (e.g., six).

Openings 452 can be arranged in two different rows, as illustrated in FIG. 4, such that each respective opening 452 is positioned over a different one of the prisms of airfield taxiway light 404. For instance, openings 452-1, 452-2, and 452-3 can be arranged in a first row of openings in cover 450, with opening 452-1 positioned over prism 448-1, opening 452-2 positioned over prism 448-2, and opening 452-3 positioned over prism 448-3. Further, openings 452-4, 452-5, 452-6 can be arranged in a second row of openings in cover 450, with opening 452-4 positioned over a first prism of the second row of three prisms, opening 452-5 positioned over a second (e.g., the middle) prism of the second row of three prisms, and opening 452-6 positioned over a third prism of the second row of the three prisms.

After the light emitted by light sources 440 passes through the prisms of airfield taxiway light 404, the light can exit airfield taxiway light 404 through openings 452. For example, the light that passes through each respective prism can exit airfield taxiway light 404 through a different opening 452 (e.g., through the opening that is positioned over that respective prism). For instance, the light that passes through prism 448-1 can exit light 404 through opening 452-1, the light that passes through prism 448-2 can exit light 404 through pending 452-2, the light that passes through prism 448-3 can exit light 404 through opening 452-3, the light that passes through the first prism of the second row of three prisms can pass through opening 452-4, the light that passes through the second prism of the second row of three prisms can pass through opening 452-5, and the light that passes through the third prism of the second row of three prisms can pass through opening 452-6.

The light can exit airfield taxiway light 404 through openings 452 such that the light is visible (e.g., to a pilot of an aircraft travelling on the taxiway) from a vertical angle of 1 degree relative to cover 450 to a vertical angle of 10 degrees relative to cover 450. Further, in examples in which the LDTFs of airfield taxiway light 404 are analogous to LDTF 116 previously described in connection with FIG. 1, the light can exit light 404 through openings 452 such that the light is visible from a horizontal angle of 3.5 degrees relative to cover 450 to a horizontal angle of −35 degrees relative to cover 450. In examples in which the LDTFs of airfield taxiway light 404 are analogous to LDTF 226 previously described in connection with FIG. 1, the light can exit light 404 through openings 452 such that the light is visible from a horizontal angle of −3.5 degrees relative to cover 450 to a horizontal angle of 35 degrees relative to cover 450.

Figure 5:
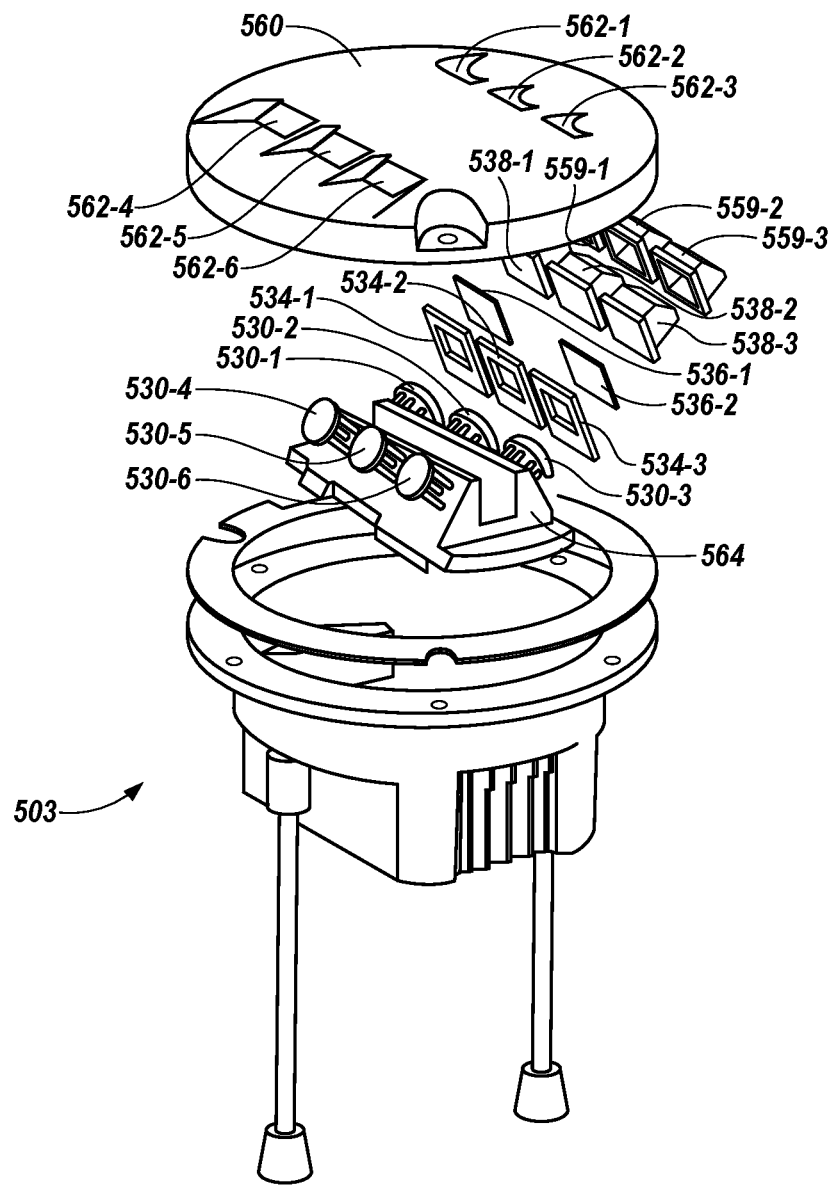
FIG. 5 illustrates an exploded perspective view of an example airfield taxiway light in accordance with an embodiment of the present disclosure.

FIG. 5 illustrates an exploded perspective view of an example airfield taxiway light 503 in accordance with an embodiment of the present disclosure. Airfield taxiway light 503 can be, for instance, a taxiway centerline wide (e.g., ultra-wide) light. For instance, airfield taxiway light 503 can be airfield taxiway light 303 previously described in connection with FIG. 3.

As shown in FIG. 5, airfield taxiway light 503 can include a mounting plate 564 that comprises a heat sink, and a plurality of light sources 530-1, 530-2, 530-3, 530-4, 530-5, 530-6, which may be collectively referred to herein as light sources 530. Light sources 530 can be coupled to mounting plate 564 (e.g., to the heat sink), as illustrated in FIG. 5.

In the embodiment illustrated in FIG. 5, airfield taxiway light 503 includes six light sources 530, which can be arranged in two different rows. For instance, light sources 530-1, 530-2, and 530-3 can be a first row of light sources that face a first direction and are analogous to light sources 330-1, 330-2, 330-3 previously described in connection with FIG. 3, and light sources 330-4, 330-5, and 330-6 can be a second row of light sources that face a second direction and are also analogous to light sources 330-1, 330-2, 330-3. For instance, light sources 530 can emit light in a manner analogous to light sources 330.

As shown in FIG. 5, airfield taxiway light 503 can include plates (e.g., prism support plates) 534-1, 534-2, 534-3, which may be collectively referred to herein as plates 534. Plates 534-1, 534-2, and 534-3 can be a first row of plates that are analogous to plates 334-1, 334-2, 334-3 previously described in connection with FIG. 3. Further, although not shown in FIG. 5 for clarity and so as not to obscure embodiments of the present disclosure, airfield taxiway light 503 can also include a second row of three plates that are also analogous to plates 334-1, 334-2, 334-3.

As shown in FIG. 5, airfield taxiway light 503 can include LDTFs 536-1, 536-2, which may be collectively referred to as LDTF 536. LDTF 536 can be analogous to LDTF 336 previously described in connection with FIG. 3. For example, LDTFs 536-1 and 536-2 can be coupled to plates 534-1 and 534-3, respectively, in a manner analogous to that previously described in connection with FIG. 3. Further, although not shown in FIG. 5 for clarity and so as not to obscure embodiments of the present disclosure, airfield taxiway light 503 can also include an analogous LDTF that can be coupled to the two outer plates of the second row of plates in an analogous manner.

The light emitted by light sources 530-1 and 530-3 can pass through LDTF 536-1 and 536-2, respectively, and the light emitted by light sources 530-4 and 530-6 can pass through the LDTF coupled to the outer two plates of the second row of plates, in a manner analogous to that previously described in connection with FIG. 3. However, the light emitted by light sources 530-2 and 530-5 may not pass through a LDTF.

As the light emitted by light sources 530-1, 530-3, 530-4, and 530-6 passes through the LDTFs, the LDTFs (e.g., the micro-prismatic structure of the LDTFs) can change the direction of (e.g., turn) the light, in a manner analogous to that previously described in connection with FIG. 3. For instance, the light emitted by light sources 530-1 and 530-4 may turn in a first direction (e.g., to the left), and the light emitted by light sources 530-3 and 530-6 may turn in a second direction (e.g., to the right), in a manner analogous to that previously described in connection with FIG. 3. However, the light emitted by light sources 530-2 and 530-5 may not turn.

As shown in FIG. 5, airfield taxiway light 503 can include prisms 538-1, 538-2, 538-3, which may be collectively referred to herein as prisms 538. Prisms 538-1, 538-2, and 538-3 can be a first row of prisms that are analogous to prisms 338-1, 338-2, 338-3 previously described in connection with FIG. 3. For instance, prisms 538-1, 538-2, 538-3 can be supported by plates 534-1, 534-2, 534-3, respectively, such that LDTF 536-1 is between light source 530-1 and prism 538-1 and LDTF 536-3 is between light source 530-3 and prism 538-3, in a manner analogous to that previously described in connection with FIG. 3. Further, after the light emitted by light sources 530-1 and 530-3 passes through (e.g., is turned by) LDTF 536, the light can pass through prisms 538-1 and 538-3, in a manner analogous to that previously described in connection with FIG. 3. Further, although not shown in FIG. 5 for clarity and so as not to obscure embodiments of the present disclosure, airfield taxiway light 503 can also include a second row of three prisms that are also analogous to prisms 538-1, 538-2, 538-3.

As shown in FIG. 5, airfield taxiway light 404 can include prism covers 559-1, 559-2, 559-3, which may be collectively referred to as prism covers 559. Each respective prism 538 can be covered by a different one of prism covers 559 to provide protection for prisms 538. For instance, prism 538-1 can be covered (e.g., protected) by cover 559-1, prism 538-2 can be covered by cover 559-2, and prism 538-3 can be covered by cover 559-3, as illustrated in FIG. 5. Further, although not shown in FIG. 5 for clarity and so as not to obscure embodiments of the present disclosure, airfield taxiway light 503 can also include three additional prism covers analogous to prism covers 559 to cover the three respective prisms of second row of prisms.

As shown in FIG. 5, airfield taxiway light 503 can include a cover (e.g., top cover) 560. Cover 560 can include a plurality of openings (e.g., windows) 562-1, 562-2, 562-3, 562-4, 562-5, 562-6, which may be collectively referred to herein as openings 562, as illustrated in FIG. 5. The number of openings 562 (e.g., six) included in cover 560 can be the same as the number of light sources 530 included in airfield taxiway light 503 (e.g., six).

Openings 562 can be arranged in two different rows, as illustrated in FIG. 5, such that each respective opening 562 is positioned over a different one of the prisms of airfield taxiway light 503. For instance, openings 562-1, 562-2, and 562-3 can be arranged in a first row of openings in cover 560, with opening 562-1 positioned over prism 538-1, opening 562-2 positioned over prism 538-2, and opening 562-3 positioned over prism 538-3. Further, openings 562-4, 562-5, 562-6 can be arranged in a second row of openings in cover 560, with opening 562-4 positioned over a first prism of the second row of three prisms, opening 562-5 positioned over a second (e.g., the middle) prism of the second row of three prisms, and opening 562-6 positioned over a third prism of the second row of the three prisms.

After the light emitted by light sources 530 passes through the prisms of airfield taxiway light 503, the light can exit airfield taxiway light 503 through openings 562. For example, the light that passes through each respective prism can exit airfield taxiway light 503 through a different opening 562 (e.g., through the opening that is positioned over that respective prism). For instance, the light that passes through prism 538-1 can exit light 503 through opening 562-1, the light that passes through prism 538-2 can exit light 503 through pending 562-2, the light that passes through prism 538-3 can exit light 503 through opening 562-3, the light that passes through the first prism of the second row of three prisms can pass through opening 562-4, the light that passes through the second prism of the second row of three prisms can pass through opening 562-5, and the light that passes through the third prism of the second row of three prisms can pass through opening 562-6.

The light can exit airfield taxiway light 503 through openings 562 such that the light is visible (e.g., to a pilot of an aircraft travelling on the taxiway) from a vertical angle of 1 degree relative to cover 450 to a vertical angle of 10 degrees relative to cover 450. Further, the light can exit airfield taxiway light 503 through openings 562 such that the light is visible from an azimuth angle of −30 degrees relative to cover 560 to an azimuth angle of 30 degrees relative to cover 560.

Figure 6:
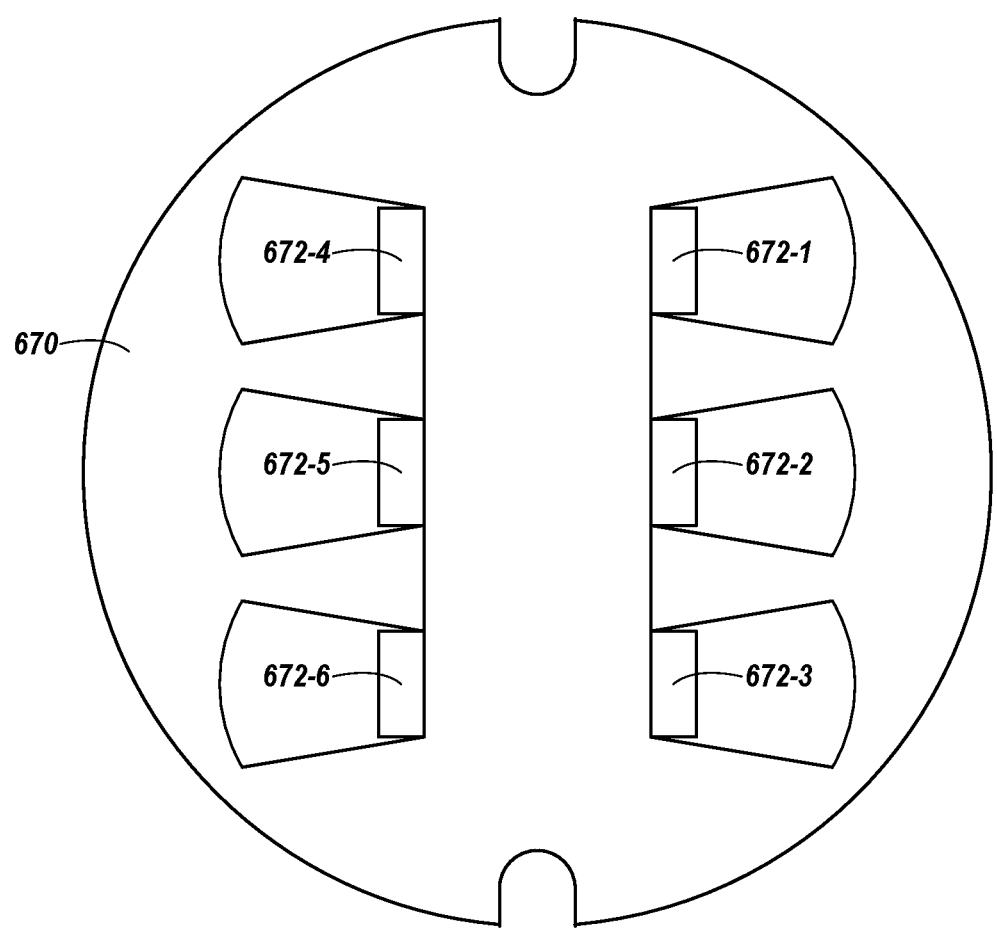
FIG. 6 illustrates an overhead view of an example cover of an airfield taxiway light in accordance with an embodiment of the present disclosure.

FIG. 6 illustrates an overhead view of an example cover (e.g., top cover) 670 of an airfield taxiway light in accordance with an embodiment of the present disclosure. Cover 670 can be, for example, cover 450 previously described in connection with FIG. 4 or cover 560 previously described in connection with FIG. 5.

For example, as shown in FIG. 6, cover 670 can include a plurality of openings (e.g., windows) 672-1, 672-2, 672-3, 672-4, 672-5, 672-6, which may be collectively referred to herein as openings 672. Openings 672 can be analogous to openings 452 previously described in connection with FIG. 4 or openings 562 previously described in connection with FIG. 5. For example, openings 672 can be arranged in two different rows, as illustrated in FIG. 6, in a manner analogous to openings 452 or 562. Further, light can exit the airfield taxiway light through openings 672, in a manner analogous to that previously described in connection with openings 452 or 562.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An airfield taxiway light, comprising:
   a plurality of light sources;
   a plurality of prisms through which light emitted by the plurality of light sources is configured to pass, wherein the light emitted by each respective light source passes through a different one of the plurality of prisms;
   a light direction turning film between at least one of the plurality of light sources and the prism through which the light emitted by that light source passes, wherein the light emitted by that light source is turned left or right by the light direction turning film prior to the light passing through the prism; and a cover having a plurality of openings through which the light that passes through the plurality of prisms is configured to exit the airfield taxiway light, wherein each respective opening is positioned over a different one of the plurality of prisms.

2. The airfield taxiway light of claim 1, wherein:
a first subset of the plurality of openings are arranged in a first row in the cover; and
a second subset of the plurality of openings are arranged in a second row in the cover.

3. The airfield taxiway light of claim 1, wherein the plurality of light sources are light emitting diodes.

4. The airfield taxiway light of claim 1, wherein the light that passes through the plurality of prisms is configured to exit the airfield taxiway light such that the light is visible from a vertical angle of 1 degree relative to the cover to a vertical angle of 10 degrees relative to the cover.

5. The airfield taxiway light of claim 1, wherein the airfield taxiway light includes a plurality of plates, wherein each respective plate is configured to support a different one of the plurality of prisms.

6. The airfield taxiway light of claim 1, wherein the airfield taxiway light includes a heat sink to which the plurality of light sources are coupled.

7. An airfield taxiway light, comprising:
a plurality of light sources;
a plurality of prisms through which light emitted by the plurality of light sources is configured to pass, wherein the light emitted by each respective light source passes through a different one of the plurality of prisms;
a light direction turning film between each respective light source and the prism through which the light emitted by that light source passes, wherein the light emitted by each respective light source is turned left or right by the light direction turning film prior to the light passing through the prism; and
a cover having a plurality of openings through which the light that passes through the plurality of prisms is configured to exit the airfield taxiway light, wherein each respective opening is positioned over a different one of the plurality of prisms.

8. The airfield taxiway light of claim 7, wherein the light emitted by each respective light source is turned in a same direction by the light direction turning film.

9. The airfield taxiway light of claim 7, wherein:
the plurality of light sources comprises six light sources; and
the plurality of prisms comprises six prisms.

10. The airfield taxiway light of claim 7, wherein the light that passes through the plurality of prisms is configured to exit the airfield taxiway light such that the light is visible from a horizontal angle of 3.5 degrees relative to the cover to a horizontal angle of −35 degrees relative to the cover.

11. The airfield taxiway light of claim 7, wherein the light that passes through the plurality of prisms is configured to exit the airfield taxiway light such that the light is visible from a horizontal angle of −3.5 degrees relative to the cover to a horizontal angle of 35 degrees relative to the cover.

12. The airfield taxiway light of claim 7, wherein a thickness of the light direction turning film is 0.01 inch.

13. An airfield taxiway light, comprising:
three light sources;
three prisms through which light emitted by the three light sources is configured to pass, wherein the light emitted by each respective light source passes through a different one of the three prisms;
a light direction turning film between two of the three light sources and the prism through which the light emitted by that light source passes, wherein the light emitted by each of the two light sources is turned left or right by the light direction turning film prior to the light passing through the prism; and
a cover having three openings through which the light that passes through the three prisms is configured to exit the airfield taxiway light, wherein each respective opening is positioned over a different one of the three prisms.

14. The airfield taxiway light of claim 13, wherein a direction of the light emitted by the third of the three light sources does not change.

15. The airfield taxiway light of claim 13, wherein:
the three light sources are arranged in a row; and
the third of the three light sources is positioned between the two of the three light sources in the row.

16. The airfield taxiway light of claim 13, wherein:
the airfield taxiway light further includes:
an additional three light sources;
an additional three prisms through which light emitted by the additional three light sources is configured to pass, wherein the light emitted by each respective additional light source passes through a different one of the additional three prisms; and
a light direction turning film between two of the three additional light sources and the additional prism through which the light emitted by that additional light source passes; and
the cover further includes an additional three openings through which the light that passes through the additional three prisms is configured to exit the airfield taxiway light, wherein each respective additional opening is positioned over a different one of the additional three prisms.

17. The airfield taxiway light of claim 13, wherein the light that passes through the three prisms is configured to exit the airfield taxiway light such that the light is visible from an azimuth angle of −30 degrees relative to the cover to an azimuth angle of 30 degrees relative to the cover.

* * * * *